(12) United States Patent
Røhr et al.

(10) Patent No.: US 9,689,749 B2
(45) Date of Patent: Jun. 27, 2017

(54) TIME-TEMPERATURE INDICATOR SYSTEM I

(75) Inventors: Åsmund K. Røhr, Oslo (NO); Peder Oscar Andersen, Oslo (NO); Brit Salbu, Oslo (NO); Eggert F. Gudjonsson, Oslo (NO); Marit Nandrup Pettersen, Askim (NO); Christian Salbu Aasland, Oslo (NO)

(73) Assignee: Keep-It Technologies AS, Oslo (NO)

( * ) Notice: Subject to any disclaimer, the term of this patent is extended or adjusted under 35 U.S.C. 154(b) by 813 days.

(21) Appl. No.: 14/112,024

(22) PCT Filed: Apr. 10, 2012

(86) PCT No.: PCT/NO2012/050059
§ 371 (c)(1),
(2), (4) Date: Dec. 18, 2013

(87) PCT Pub. No.: WO2012/141593
PCT Pub. Date: Oct. 18, 2012

(65) Prior Publication Data
US 2014/0211827 A1    Jul. 31, 2014

(30) Foreign Application Priority Data
Apr. 15, 2011 (NO) .................................. 20110589

(51) Int. Cl.
*G01K 3/00* (2006.01)
*G01K 3/04* (2006.01)

(52) U.S. Cl.
CPC ...................................... *G01K 3/04* (2013.01)

(58) Field of Classification Search
None
See application file for complete search history.

(56) References Cited

U.S. PATENT DOCUMENTS 3,194,072 A    7/1965    Vaala
3,946,611 A    3/1976    Larsson
(Continued)

FOREIGN PATENT DOCUMENTS

EP    505449 A1    9/1992
EP    1312918 A2   5/2003
(Continued)

OTHER PUBLICATIONS

International Preliminary Report on Patentability received for PCT Patent Application No. PCT/NO2012/050059, issued on Jun. 10, 2013, 12 pages.
(Continued)

*Primary Examiner* — Erica Lin
(74) *Attorney, Agent, or Firm* — Morrison & Foerster LLP

(57) ABSTRACT

The present invention relates to a time-temperature indicator system useful for monitoring the time and temperature exposure of foods, nutraceuticals, pharmaceuticals, cosmetics, chemicals and other products. The system provides improved time-temperature sensitivity, time-temperature sensitivity control and a response which better reflects that of the reactions leading to quality loss of the monitored product. Further, the invention also relates to a combination comprising a time-temperature indicator system and a product storage container or a bag closure device. A method for producing said time-temperature indicator system is also part of the present invention.

17 Claims, 4 Drawing Sheets

(56) References Cited

U.S. PATENT DOCUMENTS

| | | | |
|---|---|---|---|
| 3,967,579 | A | 7/1976 | Seiter |
| 4,045,383 | A | 8/1977 | Koff |
| 4,154,107 | A | 5/1979 | Giezen et al. |
| 4,452,995 | A | 6/1984 | Patel et al. |
| 4,834,017 | A | 5/1989 | Favetto et al. |
| 5,053,339 | A | 10/1991 | Patel |
| 6,054,318 | A * | 4/2000 | Murray ............ C12N 15/8282 435/183 |
| 7,290,925 | B1 * | 11/2007 | Skjervold ............ G01N 31/229 116/216 |
| 2004/0115319 | A1 | 6/2004 | Morris et al. |
| 2004/0253733 | A1 | 12/2004 | Prusik et al. |
| 2006/0063140 | A1 * | 3/2006 | Nussinovitch ......... C12N 11/04 435/1.1 |
| 2007/0036038 | A1 | 2/2007 | Ambrozy et al. |
| 2008/0023362 | A1 | 1/2008 | Genosar |
| 2008/0241932 | A1 | 10/2008 | Kendig et al. |
| 2011/0106000 | A1 | 5/2011 | Jones et al. |
| 2014/0098834 | A1 | 4/2014 | Røhr et al. |

FOREIGN PATENT DOCUMENTS

| | | | |
|---|---|---|---|
| EP | 1333262 | A1 | 8/2003 |
| EP | 1598667 | A1 | 11/2005 |
| EP | 1882919 | A2 | 1/2008 |
| GB | 2430257 | A | 3/2007 |
| JP | 1-141976 | A | 6/1989 |
| JP | 2009-298470 | A | 12/2009 |
| WO | 91/09287 | A1 | 6/1991 |
| WO | 01/26993 | A1 | 4/2001 |
| WO | 01/27608 | A2 | 4/2001 |
| WO | 01/64430 | A1 | 9/2001 |
| WO | 03/007088 | A2 | 1/2003 |
| WO | 2005/075978 | A2 | 8/2005 |
| WO | 2005/078402 | A1 | 8/2005 |
| WO | 2006/021953 | A2 | 3/2006 |
| WO | 2008/083926 | A1 | 7/2008 |
| WO | 2009/127529 | A1 | 10/2009 |
| WO | 2010/102721 | A1 | 9/2010 |

OTHER PUBLICATIONS

International Written Opinion received for PCT Patent Application No. PCT/NO2012/050059, mailed on Feb. 15, 2013, 7 pages.
International Written Opinion received for PCT Patent Application No. PCT/NO2012/050060, mailed on Jul. 18, 2012, 7 pages.
Norwegian Search Report received for Norwegian Patent Application No. 20110589, mailed on Nov. 15, 2011, 2 pages.
Norwegian Search Report received for Norwegian Patent Application No. 20110590, mailed on Nov. 15, 2011, 2 pages.
International Search Report received for PCT Patent Application No. PCT/NO2012/050059, mailed on Feb. 15, 2013, 5 pages.
International Preliminary Report on Patentability received for PCT Patent Application No. PCT/NO2012/050060 mailed on May 7, 2013, 6 pages.
International Search Report received for PCT Patent Application No. PCT/NO2012/050060 mailed on Jul. 18, 2012, 4 pages.
Labuza, T. P., "Application of Chemical Kinetics to Deterioration of Foods", Journal of Chemical Education, vol. 61, No. 4, Apr. 1984, pp. 348-358.
McMeekin et al., "Predictive Microbiology: Theory and Application", Research Studies Press Ltd., 1993, 12 pages.
Wanihsuksombat et al., "Development and Characterization of a Prototype of a Lactic Acid-Based Time-Temperature Indicator for Monitoring Food Product Quality", Journal of Food Engineering, vol. 100, 2010, pp. 427-434.
Yan et al., "Development and Characterization of a New Amylase Type Time-Temperature Indicator", Food Control, vol. 19, 2008, pp. 315-319.
Dranca et al., "Thermal Stability of Gelatin Gels: Effect of Preparation Conditions on the Activation Energy Barrier to Melting", Polymer, vol. 50, 2009, pp. 4859-4867.
Non Final Office Action received for U.S. Appl. No. 14/112,031, mailed on Jun. 15, 2016, 11 pages.
Notice of Allowance received for U.S. Appl. No. 14/112,031, mailed on Feb. 15, 2017, 5 pages.
Extended European Search Report (includes European Search Report and Search Opinion) received for European Patent Application No. 16185235.5, mailed on Jan. 18, 2017, 9 pages.

* cited by examiner

TIME-TEMPERATURE INDICATOR SYSTEM

CROSS REFERENCE TO RELATED APPLICATIONS

This application is a U.S. National Phase patent application of PCT/NO2012/050059, filed on Apr.; 10, 2012, which claims priority to Norwegian Patent Application No. 20110589, filed on Apr. 15, 2011, each of which is hereby incorporated by reference in the present disclosure in its entirety.

FIELD OF THE INVENTION

The present invention relates to a time-temperature indicator system useful for monitoring the time and temperature exposure of foods, nutraceuticals, pharmaceuticals, cosmetics, chemicals and other products. The system provides improved time-temperature sensitivity, time-temperature sensitivity control and a response which better reflects that of the reactions leading to quality loss of the monitored product. Further, the invention also relates to a combination comprising a time-temperature indicator system and a product storage container or a bag closure device. A method for producing said time-temperature indicator system is also part of the present invention.

BACKGROUND OF THE INVENTION

The quality of food products and other perishables are highly dependent on storage conditions such as the temperature and the storage time from production or packing until it finally reaches the end consumer. The deterioration processes are faster when the temperature is raised due to increasing biochemical or physical reaction rates, and therefore the quality of perishable goods declines more rapidly at high temperatures than at low temperatures.

Examples of perishable goods which need to be stored under conditions such that a particular temperature exposure limit is not exceeded or at least not exceeded for longer than a predetermined period of time, include fresh food products, chilled food products and food products that have been pre-cooked or processed by freezing, irradiation, partial cooking, freeze drying or steaming, including products being packages in vacuum packaging, MAP-packed packaging or other industrial packaging methods. Further examples of products which may need to be stored under appropriate temperature conditions are certain pharmaceuticals, e.g. insulin, vaccines and concentrated omega-3 products; certain nutraceuticals, e.g. supplement oils, e.g. fish oil, and vitamins; chemicals; veterinary products and certain cosmetics; which would otherwise deteriorate.

Currently date marking is the standard method applied for the insurance of storage quality. By date marking only, no information is given to the consumer or others about the storage conditions to which the product has been exposed; hence the purchasers of susceptible products are not able to determine whether the product has been stored under appropriate temperature conditions during the time of storage. Relying on date marking as a sole quality criterion presupposes that the perishable product has been stored under appropriate conditions throughout the entire storage period. To be on the safe side, producers of perishable goods often use date marking with a wide safety margin, hence products which are actually still suitable for consumption or use are often discarded.

Therefore, there is a continuing interest in the monitoring of the time and temperature to which storage sensitive products have been exposed in e.g. food, pharmaceutical and chemical distribution chains from factory to consumer.

By supplying a perishable product with a time-temperature indicator which follows the individual product from packing to sale, the producer, the grosser, the retailer and the consumer will have a better product control than they currently have. By the use of a time-temperature indicator which matches the characteristics of investigated products, the true shelf life of the products can be monitored, which means that discarding can be delayed until the applied time-temperature indicator has detected that storage conditions based on time and temperature have not been appropriate and/or exceeded.

In theory, time-temperature indicators may be classified as either partial history or full history indicators depending on their response mechanism. Partial history indicators will typically not respond unless a threshold temperature has been exceeded, while full history indicators typically respond independently of a temperature threshold and provides a cumulative response to the time and temperature to which the time-temperature indicator (and hence the product) has been exposed.

EP 505 449 (Tepnel Medical) discloses an example of a partial history time-temperature indicator comprising a fusible material such as polycaprolactone triol, polyethylene glycol C1-4 alkyl ether and polyvinyl alcohol, which flows when a given threshold temperature is exceeded and re-solidifies when exposed to temperatures below the same temperature. The fusible material flows in a substrate and an indicator system produces a physically detectable change in the substrate when the fusible material flows therein.

U.S. Pat. No. 7,290,925 (TimeTemp) discloses an example of a full history time-temperature indicator where the response given by the time-temperature indicator is easily read by the human eye, and in conjunction with a product it gives a measure of the storage conditions to which the product has been exposed by giving a cumulative response to time-temperature exposure.

The reliability of a time-temperature indicator depends to a large extent on the correlation of the time-temperature indicator response with that of reactions leading to quality loss. Unless the change in the rate with temperature of the time-temperature indicator system closely parallels the temperature dependence of the rate of quality detoriation of the monitored product, the system will not be able to accurately predict the shelf life remaining for a variable temperature distribution. Also, as the temperature dependence on quality detoriation may be different in different temperature intervals, the temperature dependency of the time-temperature indicator may in these cases advantageously be of a non-linear response.

Further, the response to time and temperature should be substantially irreversible to prevent the time-temperature indicator from being reset. It is also preferred that the time-temperature indicator is capable of indicating the time-temperature history within a wide temperature range. The indicator should also be conveniently activated so that pre-usage storage of the indicator is not a problem, and the response to time and temperature should be given in a visually and easily interpretable manner. Finally, and importantly, it should be non-toxic and not pose any threat to human health.

According to the present invention there is now provided a time-temperature indicator system useful for monitoring the time and temperature exposure of food and other products. The system provides improved time-temperature sensitivity within a wide temperature range and a response which better reflects that of the reactions leading to quality loss.

SUMMARY OF THE INVENTION

A first aspect of the present invention relates to a time-temperature indicator system, comprising at least one reactive agent and at least one mobile agent; said reactive agent(s) being contained in a first compartment adjacent to a separate second compartment containing the mobile agent(s); said first and second compartments initially being separated by suitable means for preventing contact between the mobile agent(s) and the reactive agent(s); the system being activated by bringing said two compartments into contact and thereby allow for the mobile agent(s) to migrate through a matrix contained in the first compartment; said matrix contained in the first compartment comprising a mixture of at least a first and a second matrix component; said first matrix component being a gel-forming polymer having a melting point below 90° C.; and said second matrix component being either i) a reversible gel-forming polymer having a melting point that is at least 5° C. higher than the melting point of said first matrix component or ii) an irreversible gel-forming polymer; wherein at least one of said reactive agent(s) being contained within the matrix contained in the first compartment and/or at least one of said matrix components contained in the first compartment being at least one of the reactive agent(s).

A second aspect of the present invention relates to a combination, comprising the system according to the first aspect of the present invention and a product storage container or a bag closure device.

A third aspect of the present invention relates to a method for producing the time-temperature indicator system according to the first aspect of the present invention comprising the following steps:
i) forming at least a first and a second separate compartments in a plastic sheet layer,
ii) filling said first compartment with a composition comprising the matrix$_{(sol\ state)}$ and/or the reactive agent(s) defined in claim 1;
iii) filling said second compartment with a composition comprising the mobile agent(s) defined in claim 1;
iv) sealing said compartments by a second layer;
v) optionally, allowing at least one of the matrix components defined in claim 1 to undergo a sol-gel transition;
vi) optionally, activating said device by selectively compressing at least one compartment formed by the two layers thus bringing the two compartments into contact.

A fourth aspect of the present invention relates to a bag closure time-temperature indicator device (FIGS. 8, 9), comprising a time-temperature indicator associated with, integrated with or incorporated in a bag closure device, said time-temperature indicator being capable of detecting the time and temperature exposure for a product and provides a visually detectable signal that indicates the time-temperature history of the monitored product.

Preferred embodiments of the present invention are set forth below and in the dependent claims.

DESCRIPTION OF THE FIGURES

Preferred embodiments of the present invention will now be illustrated in more detail with reference to the accompanying figures.

DETAILED DESCRIPTION OF THE INVENTION

Figure 1A:
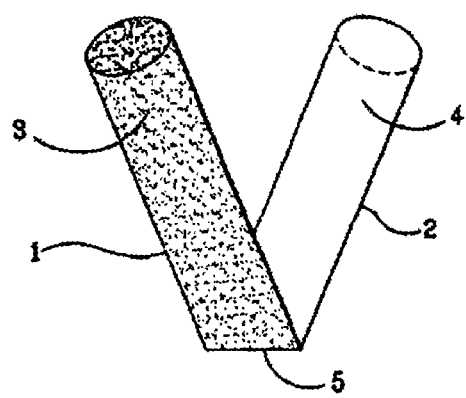
FIG. 1a illustrates a conceptual embodiment of the invention wherein the mobile agent and the reactive agent (3 and 4) are contained in a cylinder element including two compartments (1 and 2), and a sealing (5) between the two compartments (1 and 2) which is provided by bending the cylinder element.

The present invention relates to a time-temperature indicator system comprising at least one reactive agent and at least one mobile agent; the reactive agent(s) being contained in a first compartment adjacent to a separate second compartment containing the mobile agent(s).

As used herein, "a reactive agent" is intended to include an agent which interacts or reacts with the mobile agent when the two agents are brought in contact with each other, preferably in close contact and even more preferably in close contact on the molecular level.

The term "mobile agent" refers to an agent which migrates into said first compartment upon activation of the system.

Said first and second compartments initially being separated by suitable means, e.g. a sealing such as a barrier, for preventing contact between the mobile agent(s) and the reactive agent(s). In one preferred embodiment, said sealing is a peelable layer between two plastic layers.

The system may be activated by bringing said two compartments into contact, e.g. by removing or breaking the sealing between the compartments, whereby the mobile agent(s) in a time-temperature dependent manner migrates through a matrix contained in the first compartment and is thus brought in contact with the reactive agent(s). Said contact between mobile agent(s) and reactive agent(s) preferably resulting in a visually detectable signal that indicates the time-temperature history.

The matrix contained in the first compartment comprises a mixture of at least a first and a second matrix component. One of the purposes of the second matrix component is to act as support scaffolding for the first matrix component while the first matrix component provides improved time-temperature sensitivity within a wide temperature range and a response which better reflects that of the reactions leading to quality loss.

In one useful embodiment according to the invention, said second matrix component is a gel forming polymer, such as an irreversible or more preferably a reversible gel-forming polymer.

In case the second matrix component is an irreversible gel-forming polymer, it may be irreversibly set prior to activation by processes such as ionic interactions, or it may be irreversibly set after activation by ionic interactions occurring due to ions diffusing from the first compartment to the second compartment. Examples of irreversibly set is gels are polymers such as i) anionic polymers, e.g. alginates or pectins combined with polyvalent metal ions such as $Ca^{2+}$, $Cu^{2+}$, $Fe^{2+}$, $Ba^{2+}$; or ii) cationic polymers such as chitosans combined with ions such as $SO_4^{2-}$ or polyphosphates.

In case the second matrix component is a reversible gel-forming polymer, it is preferred that it does not enter sol state during activation of the system, more preferably also does not enter sol state after the system has been activated.

A reversible gel-forming polymer is a polymer that exists as a solution (sol state) or as a solid jelly-like material (gel state) depending on the imposed conditions. Accordingly, it is preferred that the melting point of the second matrix component is as high as possible, or at least as high as being outside the assumed working range of the time-temperature indicator system. If the melting point of the second matrix component is within the working range, the integrity of the indicator may be affected and thus result in changes in functionality, in example speeding up of the indicator, broadening of the reaction front or other artifacts.

In one embodiment the melting point of the second matrix component is at least 5° C., preferably at least 10° C., more preferably at least 15° C., most preferably at least 20° C. higher than the melting point of said first matrix component. In another embodiment the melting point of the second matrix component is at least 30° C., preferably at least 40° C., more preferably at least 50° C. or at least 60° C. and most preferably at least 70° C. higher than the melting point of said first matrix component.

In another embodiment, the melting point of the second matrix component is in the range 0-100° C., more preferably in the range 10-100° C., even more preferably in the range 20-100° C. and most preferably in the range 30-100° C. e.g. in the range 40-100° C., in the range 50-100° C., in the range 60-100° C., in the range 70-100° C., in the range 80-100° C. or in the range 90-100° C.

Optionally, said second matrix component is a reversible gel-forming polymer which has a melting point above −30° C., above −20° C. or above −10° C., preferably above 0° C., more preferably above 10° C., even more preferably above 20° C. and most preferably above 30° C. such as e.g. above 40° C., above 50° C., above 60° C., above 70° C., above 80° C. or above 90° C.

The melting point of a gel is the temperature at which it changes state from gel to liquid, enters gel-sol transition. The melting point of a substance depends (usually slightly) on pressure, but is herein intended to be defined at standard atmospheric pressure if not otherwise specified. Most of the commercially available gel-forming polymers have a well defined melting point. However, there also exist a number of different techniques for measuring the melting point of a gel, including differential scanning calorimetry (DSC). If not otherwise specified herein, the referred melting points are measured by using differential scanning calorimetry (Polymer 50 (2009) 4859-4867).

In order to be able to act as support scaffolding for the first matrix component without negatively affecting the overall time-temperature sensitivity of the system, the concentration of the second matrix component should be in the range 0.01-30% by weight, more preferably in the range 0.1-20% by weight, even more preferably in the range 0.1-15% by weight and most preferably in the range 0.1-10% by weight, e.g. in the range 0.1-5% by weight or in the range 0.1-2% by weight. Said concentration being calculated as the quantity of solid gel-forming polymer as compared to the total weight of the ingredients including the solid gel-forming polymer.

Further, the gel forming polymer of the second matrix component may be in the form of a synthetic or natural colloid gel-forming polymer, or a combination thereof; or more preferably in the form of a synthetic or natural hydrocolloid gel-forming polymer, or a combination thereof. In the case of a hydrocolloid gel-forming polymer, the hydrocolloid preferably being selected from the group consisting of an alginate, such as Na-alginate, alginic acid or propylene glycol alginate; a carrageenan (e.g Kappa, Iota, or Lambda carrageenan, refined or semi-refined); an agar or agarose, a gum, a cellulose (such as CMC, HPMC, MC), starches containing amylase and/or amylopectin, starch derivatives such as carboxymethyl, carboxyethyl or carboxypropyl starch, starch esters such as starch acetates and a protein (such as gelatine from mammals or fish, e.g gelatine from cold water or tropical water fish), or salts and derivatives thereof.

In a presently preferred embodiment of the invention as described herein, said first matrix component is a gel forming polymer, preferably a reversible gel forming polymer, which provides improved time-temperature sensitivity to the system within a wide temperature range and a response which better reflects that of the reactions leading to quality loss of the monitored product.

As demonstrated in example 2a and 2b, the mobility of the mobile agent is highly dependent on whether said first matrix component is in its sol or gel state and the time-temperature sensitivity of the system seems to be significantly improved at temperatures close to the melting point of the first matrix component. Accordingly, it is preferred that said first matrix component is a gel forming polymer having a melting point close to the temperature range where increased temperature sensitivity is needed, such as for the use with a temperature sensitive product in the relevant storage temperatures. For chilled products this may be in the range of 0-20° C., preferably 0-16° C., more preferably 0-12° C. and most preferably 0-8° C.

However, in the case where chilled products would need added temperature sensitivity at higher temperatures, e.g in order to have added temperature response at higher temperatures, the melting temperatures may be in the range of 20-50° C. This will aid in proper responses in case of excessive temperature abuse.

Further, by selecting the gel-forming polymer of the first matrix component according to its melting point, the time-temperature dependent mobility of the mobile agent may be adjusted to reflect the rate of quality detoriation of the monitored product. Since the rate of mobility of the mobile agent and the overall time-temperature sensitivity of the system may vary between different gel-forming polymers, even when said gel-forming polymers have similar or identical melting points, selection among different gel-forming polymers having similar or identical melting points may be used to fine tune the time-temperature indicator system to better reflect the rate of quality detoriation of the monitored product.

In one embodiment according to the present invention, a matrix is also contained in said second compartment. The matrix contained in said second compartment being identical to or different from the matrix contained in the first compartment.

In one embodiment, at least one of said reactive agent(s) or said reactive agent(s) is preferably contained within the matrix contained in the first compartment. Said at least one reactive agent or said reactive agent(s) preferably being immobilized or substantially immobilized in the matrix contained in the first compartment. Even though the reactive agent(s) may have some degree of mobility (migration) within the immobilizing material, the migration is very restricted.

As used herein, "a substantially immobilized agent" is intended to include an agent which is significantly less mobile (reduced migration) than said mobile agent. In one embodiment, the substantially immobilized agent has at least 50% reduced migration, preferably at least 60% reduced migration, more preferably at least 70% reduced migration, even more preferably at least 80% reduced migration, most preferably at least 90% reduced migration, e.g. 95%, 96%, 97%, 98% or 99% (e.g. 99.2%, 99.6%, 99.8% or 100% reduced migration) as compared to the mobile agent under similar conditions.

In a particularly preferred embodiment of the present invention said reactive agent is contained within the matrix contained in the first compartment, said reactive agent being iodine and said matrix contained in the first compartment comprising starch, modified starch or any combination thereof. In such an embodiment it is preferred that Glucose, Fructose, Tiosulphate or any combination thereof represents the mobile agent(s).

In another embodiment according to the present invention, at least one of said matrix components contained in the first compartment represents at least one of the reactive agent(s) or represents the reactive agent(s). Preferably said second matrix component or said first matrix component, most preferably said second matrix component, contained in the first compartment represents at least one of the reactive agent(s) or represents the reactive agent(s).

In a particularly preferred embodiment of the present invention at least one of said matrix components contained in the first compartment represents the reactive agent, said reactive agent being a starch-iodine complex. In such an embodiment it is preferred that Glucose, Fructose, Tiosulphate or any combination thereof represents the mobile agent(s).

In another particularly preferred embodiment of the present invention at least one of said matrix components contained in the first compartment represents the reactive agent, said reactive agent being carrageenan. In such an embodiment it is preferred that methylene blue represents the mobile agent.

As discussed above, a matrix may also be contained in said second compartment. However, as it is not preferred to have any reactive agent(s) present in the second compartment it is preferred that those matrix components which may be regarded as a reactive agent is not present in said second compartment.

Thus, a first aspect of the present invention relates to a time-temperature indicator system, comprising at least one reactive agent and at least one mobile agent; said reactive agent(s) being contained in a first compartment adjacent to a separate second compartment containing the mobile agent(s); said first and second compartments initially being separated by suitable means for preventing contact between the mobile agent(s) and the reactive agent(s); the system being activated by bringing said two compartments into contact and thereby allow for the mobile agent(s) to migrate through a matrix contained in the first compartment; said matrix contained in the first compartment comprising a mixture of at least a first and a second matrix component; said first matrix component being a gel-forming polymer having a melting point below 90° C.; and said second matrix component being either i) a reversible gel-forming polymer having a melting point that is at least 5° C. higher than the melting point of said first matrix component or ii) an irreversible gel-forming polymer; wherein at least one of said reactive agent(s) is contained within the matrix contained in the first compartment and/or at least one of said matrix components contained in the first compartment is at least one of the reactive agent(s).

The time-temperature indicator system according to the present invention may be a full history time-temperature indicator system, a partly history time-temperature indicator system or a combination thereof.

As used herein, "a time-temperature indicator system which is both a full and partly history time-temperature indicator system" is intended to include a system which is classified as a full history time-temperature indicator system within specific temperature range(s) while being classified as a partly history time-temperature indicator system outside these temperature range(s). This is typically the case for a time-temperature indicator systems which comprises ingredients (e.g. water) which enters liquid to solid phase transitions (e.g. liquid to ice) at a certain temperature (e.g at 0° C.). Such a phase transition often results in drastic changes in the properties of the system including its response mechanisms.

As shown in example 2a and 2b, the time-temperature indicator system of the present invention has a significant higher temperature sensitivity as compared to time-temperature indicator systems of prior art. This increase in temperature sensitivity has been achieved by including a temperature sensitive material in the matrix contained in said first compartment. While said second matrix component mainly act as support scaffolding, said first matrix component provides the improved time-temperature sensitivity within a wide temperature range.

Accordingly, it is preferred that said first matrix component is a gel forming polymer having a melting point close to the temperature range where increased temperature sensitivity is needed, e.g. close to the recommended storage temperature of the product to be monitored.

Accordingly, the gel-forming polymer of the first matrix component may have a melting point below 90° C., below 80° C., below 70° C., below 60° C., below 50° C., below 40°

C., below 30° C., below 20° C., below 10° C., below 5° C., below −5° C., below −10° C. or below −15° C.

Optionally, the gel-forming polymer of the first matrix component may have a melting point in the range i) 0-90° C., 0-80° C., 0-70° C., 0-60° C., 0-50° C., 0-40° C., 0-30° C., 0-20° C., 0-10° C., 0-4° C. or 0-2° C.; ii) in the range −20 to 90° C., −20 to 80° C., −20 to 70° C., −20 to 60° C., −20 to 50° C., −20 to 40° C., −20 to 30° C., −20 to 20° C., −20 to 10° C., −20 to 6° C. or −20 to 4° C.; iii) in the range −10 to 90° C., −10 to 80° C., −10 to 70° C., −10 to 60° C., −10 to 50° C., −10 to 40° C., −10 to 30° C., −10 to 20° C., −10 to 10° C., −10 to 4° C. or −10 to 2° C.; or iv) in the range −5 to 90° C., −5 to 80° C., −5 to 70° C., −5 to 60° C., −5 to 50° C., −5 to 40° C., −5 to 30° C., −5 to 20° C., −5 to 10° C., −5 to 4° C. or −5 to 2° C.

In order to be able to provide improved time-temperature sensitivity within a wide temperature range and a response which better reflects that of the reactions leading to quality loss without negatively affecting the overall temperature sensitivity of the system, the concentration of the first matrix component should be in the range 1-80% by weight, more preferably in the range 5-70% by weight, even more preferably in the range 10-60% by weight and most preferably in the range 15-60% by weight, e.g. in the range 20-60% by weight. Said concentration being calculated as the quantity of solid gel-forming polymer as compared to the total weight of the system.

Further, the gel forming polymer of the first matrix component may be in the form of a synthetic or natural colloid gel-forming polymer, or a combination thereof; or more preferably in the form of a synthetic or natural hydrocolloid gel-forming polymer, or a combination thereof. In the case of a hydrocolloid gel-forming polymer, the hydrocolloid is preferably selected from the group consisting of a carrageenan (e.g Kappa, Iota or Lambda), an agar, a gum, a cellulose (such as HPMC, MC) starches containing amylase and/or amylopectin, starch derivatives such as carboxymethyl, carboxyethyl or carboxypropyl starch, starch esters such as starch acetates and a protein such as gelatine from mammals or fish (such as gelatine from mammals or fish, e.g gelatine from cold water or tropical water fish), or salts and derivatives thereof.

In one particularly preferred embodiment according to the first aspect of the present invention,
 i. said first matrix component is a mixture comprising water and gelatine derived from cold water fish and said second matrix component is a mixture comprising water and mammalian derived gelatine;
 ii. said first matrix component is a mixture comprising water and gelatine derived from cold water fish and said second matrix component is a mixture comprising water and agar;
 iii. said first matrix component is a mixture comprising water and gelatine derived from tropical water fish and said second matrix component is a mixture comprising water and mammalian derived gelatine; or
 iv. said first matrix component is a mixture comprising water and mammalian derived gelatine and said second matrix component is a mixture comprising water and agar.

The matrix contained in the first compartment comprises a mixture of at least a first and a second matrix component, said second matrix component acting mainly as support scaffolding for the first matrix component. Accordingly, it is preferred that said matrix is formed by mixing the matrix components when in their sol state, more preferably by mixing the matrix components when in their sol state and then allow at least one of said matrix components to undergo sol-gel transition.

Figure 1B:
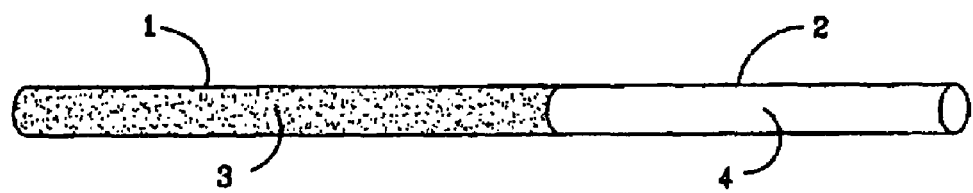
FIG. 1b illustrates the embodiment shown in FIG. 1a, wherein the seal has been removed by unbending the cylinder element.
Figure 6:
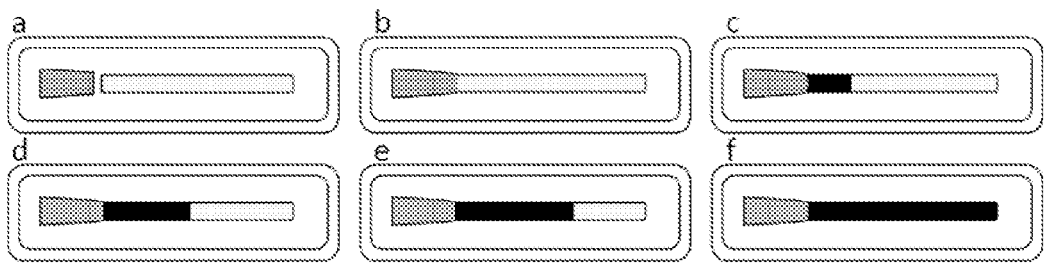
FIG. 6 illustrates one embodiment of the time-temperature indicator system according to the present invention: (a) before activation; (b) immediately after activation; (c-f) colour developing reaction.

The compartments of the system may be of variable dimensions i.e. either compartment can be triangular, wave-shaped, curved, sinusoidal, leaf like; circular, oval, elliptical; cylindrical (FIGS. 1 and 2); rectangular (FIGS. 6 and 7) pentagonic, diamond, tear-dropped, trapezoidal, symmertrical or non-symmertical; or any combination thereof.

The size of the compartments may be variable i.e. either compartment can have a length of up to 4 mm; 8 mm; 20 mm; 30 mm; 40 mm or above; with width of up to 1 mm; 2 mm; 4 mm; 6 mm; 8 mm; 10 mm; or above; with height of up to 0.1 mm; 0.5 mm; 1 mm; 2 mm; 4 mm; or above.

The matrix weight of either compartment may be of variable weight, ie. up to 10 mg, up to 20 mg; up to 40 mg; up to 80 mg; up to 160 mg; up to 320 mg; or higher Further, the compartments of the system can be made of different materials such as glass and polymeric materials. Such a polymeric material can e.g. be polyethylene, polyester (APET, OPET), pvc, polypropylene, or laminates.

Figure 2:
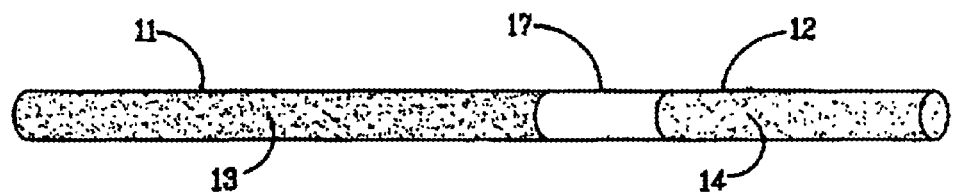
FIG. 2 illustrates a conceptual embodiment of the invention wherein the mobile agent and the reactive agent (13 and 14) are contained in a cylinder element including two compartments (11 and 12) and the sealing between the two compartments (11 and 12) is provided by a barrier (17).

The suitable means for preventing contact between the at least one mobile agent and the at least one substantially immobilized agent may be provided by bending the time-temperature indicator system to occlude the transition between the compartments (FIG. 1a and b) or it may be provided by a barrier such as thin polymer film (FIG. 2). The barrier may also be provided by means of a material such as e.g. a wax, which is solid within a certain temperature range, but flows when a given threshold temperature is exceeded.

The system is typically activated by breaking or removing the sealing between the two compartments containing the agents. The breaking can e.g. be performed by means of exposing the sealing to mechanical stress, irradiation or heat. In the case the suitable means for preventing contact between the at least one mobile agent and the at least one reactive agent is provided by bending the time-temperature indicator system, the system is typically activated by unbending the time-temperature indicator system.

Once the system is activated, the mobile agent(s) migrates through the matrix contained in the first compartment in a time-temperature dependent manner, and by doing so is brought into contact with the reactive agent(s). The reaction or interaction between said mobile agent and said reactive agent is preferably a chemical or physical reaction, more preferably chemical reaction. Even more preferably said reaction or interaction is selected from the group consisting of redox reaction, complex formation, chelate formation and precipitation.

Figure 7:
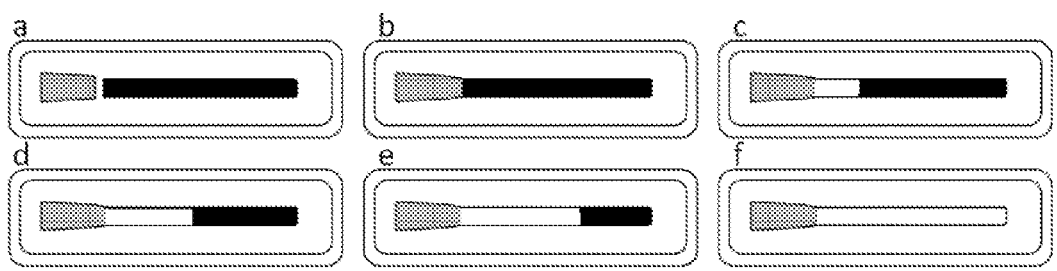
FIG. 7 illustrates one embodiment of the time-temperature indicator system according to the present invention: (a) before activation; (b) immediately after activation; (c-f) colour fading reaction.

Further, it is preferred that said reaction or interaction is substantially irreversible, more preferable irreversible, to prevent the time-temperature indicator from being reset. Preferably, the reaction or interaction is visually detectable, preferably by a change in colour such as e.g. colour developing reaction (FIG. 6) or a colour fading reaction (FIG. 7).

The reaction front of the system is preferably visually clear and distinct, such that there is a low chance of misinterpretation of the reaction front. A visually defined front may be defined such that the full color change of the visual interface (front) occurs within less than 4 mm, less than 2 mm; less than 1 mm; less than 0.5 mm; less than 0.25 mm; or less than 0.1 mm.

In one embodiment according to the present invention,
 i. at least one of said reactive agents is a reducing agent and at least one of said mobile agents is an agent which is reduced by said reducing agent when the two agents are brought in contact with each other;

ii. at least one of said mobile agents is a reducing agent and at least one of said reactive agents is an agent which is reduced by said reducing agent when the two agents are brought in contact with each other;

iii. at least one of said reactive agents is an oxidizing agent and at least one of said mobile agents is an agent which is oxidized by said oxidizing agent when the two agents are brought in contact with each other;

iv. at least one of said mobile agents is an oxidizing agent and at least one of said reactive agents is an agent which is oxidized by said oxidizing agent when the two agents are brought in contact with each other;

v. at least one of said reactive agents is an agent which forms a complex with at least one of said mobile agents when the two agents are brought in contact with each other;

vi. at least one of said reactive agents is an agent which forms a precipitate with at least one of said mobile agents when the two agents are brought in contact with each other; or vii. at least one of said reactive agents is an agent which forms a chelate with at least one of said mobile agents when the two agents are brought in contact with each other.

viii. In order for the reaction or interaction to be visually detectable, preferably by a change in colour, the at least one mobile agent prior to activation of the system is present at a concentration which is in the range 0.001-1 M, such as e.g. 0.01-1 M or 0.1-1 M. Further, it is preferred that the at least one reactive agent prior to activation of the system is present at a concentration which is in the range 0.001-1 M, such as e.g. 0.01-1 M or 0.1-1 M.

In one embodiment according to the present invention, the at least one mobile agent prior to activation of the system is present at a concentration which is higher than the concentration of the reactive agent. Preferably, the at least one mobile agent prior to activation of the system is present at a concentration which is 2×, 4×, 6×, 8×, 10×, 15×, 20×, 25×, 30× or 50× higher than the concentration of the reactive agent.

It is preferred that the mobile agent(s), the reactive agent(s) and the formed product(s) are not poisonous to human health and hence do not represent a hazard to consumers. Said formed product(s) being the product(s) that is formed when the mobile agent(s) interact or react with the reactive agent(s).

In one useful embodiment of the system according to the invention, the mobile agent—reactive agent pair is selected from the pairs listed in the below table.

| Mobile agent - Reactive agent Pair | |
|---|---|
| Mobile agent | Reactive agent |
| Methylene blue | Carrageenan |
| $Fe^{3+}$ or $Cu^{2+}$ salt | $FeCN_6^{4-}$ salt |
| $FeCN_6^{4-}$ salt | $Fe^{3+}$ or $Cu^{2+}$ salt |
| Iodide | $Cu^{2+}$ salt |
| Sulphate, Carbonate or Phosphate | $Ca^{2+}$ salt |
| Glucose, Fructose or Tiosulphate | Starch-iodine complex |
| Glucose, Fructose or Tiosulphate | Iodine |
| $Fe^{2+}$ salt | $FeCN_6^{3-}$ salt |
| $FeCN_6^{3-}$ salt | $Fe^{2+}$ salt |

In one embodiment according to the present invention, the mobile agent is a reducing agent and the reactive agent is an agent which changes colour upon reduction. In another embodiment according to the present invention, the reactive agent is a reducing agent and the mobile agent is an agent which changes colour upon reduction. Ferroin is an example of a pH independent agent which upon reduction changes colour from slightly blue to red and methylene blue is an example of a pH dependent agent which changes colour from blue to colourless upon reduction. Other suitable agents which changes colour upon reduction are 2,2'-Bipyridine(Ru or Fe complexes); Nitroferroin; 5,6-Dimethylferroin; Phenylanthranilic acid; Ethoxy chrysoidine; o-Dianisidine; Sodium diphenylamine sulfonate; Viologen; Diphenylbenzidine; Diphenylamine; Sodium 2,6-Dibromophenol-indophenol; Sodium 2,6-Dichlorophenol-indophenol; Sodium o-Cresol indophenol; Thionine; Indigotetrasulfonic acid; Indigotrisulfonic acid; Indigo carmine; Indigomono sulfonic acid; Phenosafranin; Safranin; Neutral red; variamine blue; potassium permanganate; xylenol orange; and xylene cyanol.

In one preferred embodiment according to the present invention said reactive agent(s) is being contained within the matrix contained in the first compartment; the mobile agent is selected from the group consisting of glucose, fructose, tiosulphate or any combination thereof; the reactive agent is iodine; and said first matrix component or said second matrix component is selected from the group consisting of starch, starch derivative or any combination thereof.

In another preferred embodiment according to the present invention at least one of said matrix components contained in the first compartment is at least one of the reactive agent(s); the mobile agent is selected from the group consisting of glucose, fructose, tiosulphate or any combination thereof; and the reactive agent is selected from the group consisting of starch-iodine complex, starch derivative-iodine complex or any combination thereof.

The system according to the present invention is capable of indicating the time-temperature history within a temperature range having a difference between the upper and lower limit which preferably is not higher than 50° C., preferably in the temperature range of −20° C. to 30° C., such as in the range of −20° C. to 12° C. However the system according to the invention is also capable of indicating the time-temperature history in the temperature range of 30° C. to 90° C., e.g. 30° C. to 50° C.

In a presently preferred embodiment of the invention as described herein, the time-temperature system yield a temperature sensitivity calculated to be in the range 12-50 kcal/mole (such as e.g. in the range 12-40 kcal/mole or 12-30 kcal/mole), more preferably in the range 14-50 kcal/mole (such as e.g. in the range 14-40 kcal/mole or 14-30 kcal/mole), even more preferably in the range 16-50 kcal/mole (such as e.g. in the range 16-40 kcal/mole or 16-30 kcal/mole) and most preferably in the range 20-50 kcal/mole (such as e.g. in the range 20-40 kcal/mole or 20-30 kcal/mole).

In one embodiment, said temperature sensitivity preferably being based on data obtained at i) 2, 4 and 8° C.; ii) 6, 12 and 16° C.; iii) 12, 24 and 48° C.; or iv) 24, 48 and 96 C.

There are a number of ways to calculate the temperature sensitivity of the time-temperature system according to the present invention. If not otherwise specified, the is above temperature sensitivity data are calculated according to the methods described by T.P. Labuza (Journal of Chemical Education, Volume 61, Number 4, April 1984).

It is also within the scope of the invention that the above system can be associated with, integrated with or incorporated in a product storage container. Thus, a second aspect of the present invention relates to a combination comprising the system according to the present invention and a product storage container.

Products that may be contained in said product storage container includes e.g. food products, chemical products, pharmaceutical products, veterinary products, cosmetics or biological materials. Typically such food products are products which are fresh, frozen, preserved or dehydrated, and typical biological materials are products like e.g. diagnostic reagents, blood and blood components, plants, seeds and semen.

The system is preferably attached to an inner or outer surface of the product storage container, optionally integrated in the material of the product storage container. Typical containers are e.g. cans, cartons, flasks, trays, bags and jars, said containers being in example MAP-packed or vacuum packed.

The association of the system to such containers can be provided by means of an adhesive layer on the system by which the system will be substantially irremovable when associated with the container. The association of the system to the container can be constructed in such a way that if the system is attempted to be removed from the container by which it is associated, it will break or be destroyed. By this it can prevented that the system is tampered with.

Figure 8:
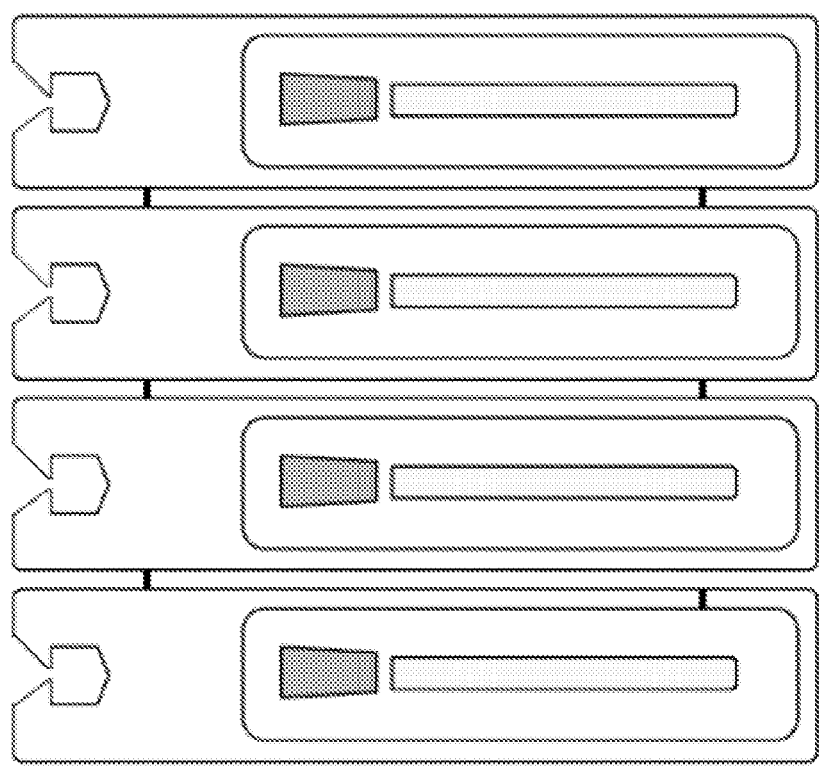
FIG. 8 illustrates one embodiment of the combination according to the present invention comprising the time-temperature indicator system and a bag closure device.
Figure 9:
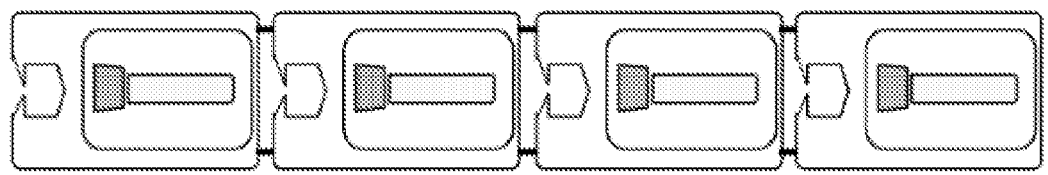
FIG. 9 illustrates one embodiment of the combination according to the present invention comprising the time-temperature indicator system and a bag closure device.

It is also within the scope of the invention that the above system can be associated with, integrated with or incorporated in a bag closure device (FIGS. 8 and 9). Thus, a further aspect of the present invention relates to a combination comprising the system according to the present invention and a bag closure device.

A fourth aspect of the present invention relates to a bag closure time-temperature indicator device (FIG. 8, FIG. 9), comprising a time-temperature indicator associated with, integrated with or incorporated in a bag closure device, said time-temperature indicator being capable of detecting the time and temperature exposure for a product and provides a visually detectable signal that indicates the time-temperature history of the monitored product.

In a preferred embodiment according to the fourth aspect of the present invention, said time-temperature indicator device is not activated by opening the bag.

In another preferred embodiment according to the fourth aspect of the present invention, said bag closure time-temperature indicator device does not comprise any means for activating the time-temperature indicator.

In another preferred embodiment according to the fourth aspect of the present invention, said time-temperature indicator provides a visual indication of the time-temperature history of the product within said bag from the time of packing onwards.

The bag closure time-temperature indicator may be of particular use for products wherein there is a technical difficulty, or cost related difficulty, in attaching the indicator to product bag as a separate device. The bag closure time-temperature indicator has several technical benefits, and may give advantages such as being able to both close a product bag and provide a means for measuring the time-temperature exposure for the product in a one-step procedure which is both cost effective and time effective. It also eliminates the need for providing first a bag closures and second a separate time-temperature indicator to the product.

The bag closure time-temperature indicator may be provided as a single unit prior to attachment to the product packaging, and may be a) produced by a combined process wherein the closure device is part of the same structure as the indicator for measuring the time and temperature exposure, such that the supporting structure plate for the indicator also provides the structure used in the closure device; i.e. being a polymer based structure, such as a plastic material comprising a PP, PE, PET or laminate plastics, capable of providing structure to the entire device;

b) produced separately, such that the closure device and the indicator for measuring the time and temperature exposure is combined in a separate step prior to attachment, such combining method comprising glue, welding, stitching, or other conventional means for combining materials;

c) produced by a method comprising the steps of
i) forming at least two separate cavities in a plastic sheet layer;
ii) forming the plastic sheet layer into a bag closure device suitable for closing a product bag;
iii) filling said cavities with liquid homogeneous matrixes comprising an aqueous hydrocolloid gel-forming polymer and reactive materials,
iv) sealing said cavities by a enclosing cavities with a second layer
v) optionally, allowing at least one of said matrixes to undergo a sol-gel transition
vi) optionally, activating said device by selectively compressing at least one cavity formed by the two layers thus bringing the matrixes comprising reactive materials into contact such that the reaction is initiated; in one preferred embodiment step v) is mandatory; in another preferred embodiment step vi) is mandatory; or d) produced by a method comprising the steps of
i) forming at least a first and a second separate compartments in a plastic sheet layer,
ii) forming the plastic sheet layer into a bag closure device suitable for closing a product bag;
iii) filling said first compartment with a composition comprising the matrix$_{(sol\ state)}$ and the reactive agent(s) defined in claim 1;
iv) filling said second compartment with a composition comprising the mobile agent(s) defined in claim 1;
v) sealing said compartments by a second layer;
vi) optionally, allowing at least one of the matrix components defined in claim 1 to undergo a sol-gel transition;
vii) optionally, activating said device by selectively compressing at least one compartment formed by the two layers thus bringing the two compartments into contact; in one preferred embodiment step vi) is mandatory; in another preferred embodiment step vii) is mandatory.

In one embodiment the bag closure time-temperature indicators may be attached to each other end-to-end (FIG. 9) or attached to each other side-by-side (FIG. 8) prior to activation and attachment to the bag. The chain of bag closure time-temperature indicators may preferably consist of the same base structure, wherein the structure is cut such that there are thin residual attachment points or strings between each device. The chain of indicators are preferably broken during the attachment process, i.e. by mechanical, heating or irradiational stress to the chain.

The bag closure time-temperature indicator may be square; rectangular; rectangular with rounded corners; with a length of up to 4 mm; 8 mm; 20 mm; 30 mm; 40 mm; 80 mm; 160 mm or above; with width of up to 1 mm; 2 mm; 4 mm; 6 mm; 8 mm; 10 mm; 20 mm; 30 mm; 40 mm; 80 mm; or above with height of up to 0.1 mm; 0.5 mm; 1 mm;

2 mm; 4 mm; 6 mm; 10 mm or above; and may be triangular, wave-shaped, curved, sinusoidal, leaf like; circular, oval, elliptical; cylindrical; pentagonic, diamond, tear-dropped, trapezoidal, symmetrical or non-symmetrical; or combinations thereof, and may further comprise an area which is cut out in order to provide sufficient properties for closing a product bag.

The time-temperature indicator region of the bag closure time-temperature indicator may be triangular, wave-shaped, curved, sinusoidal, leaf like; circular, oval, elliptical; cylindrical; pentagonic, diamond, tear-dropped, trapezoidal, symmetrical or non-symmetrical; or combinations thereof; and may comprise one or more regions of indication.

The device may comprise a polymeric structure said structure comprising polystyrene (PS), polypropylene (PP) and/or polyester materials such as polyethylene terephthalate (i.e. crystalline; oriented or amorphous); PVC=Poly Vinyl Chloride; Expanded Polystyrene; SBS=Solid Bleached Sulfate paperboard; paperboard; HDPE=High or low density Polyethylene (HDPE/LDPE), however a preferred structure may comprise a PET laminate structure or PVC.

The indicator may be attached to the product by squeezing the product material, such as a plastic bag, into the indicator, if the indicator is rigid and comprising a fastening mechanism, such as shown in FIGS. 8 and 9, or by bending the indicator around the plastic bag, if the indicator is a flexible element which may be bent. The bag closure time-temperature indicator may advantageously be activated and attached to the packaging using a regular or modified bag closing machine. The device may advantageously be activated in the process of attaching to the product packaging material in order to provide the best indication of the time and temperature exposure for the product.

The device may provide a visual response with time and temperature exposure, such visual response preferably being a color change. Further, the device may provide an irreversible or substantially irreversible response of said time and temperature exposure.

The device may be suitable for all products currently being closed with ordinary bag closure devices or bag seals, i.e. bakery goods, such as bread or hotdog buns, fruits, and a variety of other products capable of being closed with bag closure devices.

One embodiment is a combination, comprising a bag closure device and a time-temperature indicator system (FIG. 8, FIG. 9), said time-temperature indicator system comprising at least one reactive agent and at least one mobile agent; said reactive agent(s) being contained in a first compartment adjacent to a separate second compartment containing the mobile agent(s); said first and second compartments initially being separated by suitable means for preventing contact between the mobile agent(s) and the reactive agent(s); the system being activated by bringing said two compartments into contact and thereby allow for the at least one mobile agent to enter the first compartment.

In a third aspect of the present invention there is also provided a method for producing the time-temperature indicator system according to the first aspect of the present invention, said method comprising the following steps:
i) forming at least a first and a second separate compartments in a plastic sheet layer,
ii) filling said first compartment with a composition comprising the matrix$_{(sol\ state)}$ and/or the reactive agent(s) as defined in the first aspect of the present invention;
iii) filling said second compartment with a composition comprising the mobile agent(s) as defined in the first aspect of the present invention;
iv) sealing said compartments by a second layer;
v) optionally, allowing at least one of the matrix components to undergo a sol-gel transition;
vi) optionally, activating said device by selectively compressing at least one compartment formed by the two layers thus bringing the two compartments into contact.

In one preferred embodiment according to the third aspect of the present invention, step v) is mandatory. In another preferred embodiment according to the third aspect of the present invention step vi) is mandatory.

The invention will now be described by way of illustration in the following non-limiting examples.

EXAMPLES

The following examples are meant to illustrate how to make and use the invention. They are not intended to limit the scope of the invention in any manner or to any degree.

Example 1

Time-temperature Indicator System A

"Fish Derived Gelatine"
Preparing the Content which are to be Included in the First Compartment (Gel-strip)

54 g 22% HiPure fish derived gelatine (Norland Products Inc., USA) is dissolved in 46 g water which has been pre-heated to a temperature of about 65° C. Sodium hydroxide is then added until a pH of about 8 has been reached. 2 g type B-gelatine (Sigma), 5 g trehalose (Sigma) and 2 g 1% by weight i-carrageenan (Sigma) are then included and the mixture agitated for about 10 minutes.
First matrix component: HiPure fish derived gelatine.
Second matrix component: type B-gelatine.
Immobilized agent=i-carrageenan.
Preparing the Content which are to be Included in the Second Compartment (Reservoir)

2.5 g methylene blue (Sigma) is dissolved in 73 g water which has been pre-heated to a temperature of about 90° C. The mixture is then agitated for about 10 minutes. 5 g type B-gelatine (Sigma), 25 g 45% HiPure fish derived gelatine (Norland Products Inc., USA) and 2 g trehalose (Sigma) are then included and the mixture agitated until a temperature of about 65° C. has been reached.
First matrix component: HiPure fish derived gelatine.
Second matrix component: type B-gelatine.
Mobile agent=methylene blue.
Preparing Unactivated Time-temperature Indicator System The content which are to be included in the first and second compartments was kept at 50° C. allowing the compositions to remain liquid. The two compositions were then dispensed using fine nozzles into each of two separate plastic polyester cavities prepared by thermoforming a laminate plastic sheet (Wipak) using a blister packaging machine. The filled cavities was sealed using a Polyester top laminate film (Wipak), resulting in a blister packed liquid material in two separate compartments. The unactivated time-temperature indicator systems were then left at room temperature and allowed to cool and gel.
Activating the Above Time-temperature Indicator System The time-temperature indicator system was activated by breaking the sealing between the two compartments.

Figure 3:
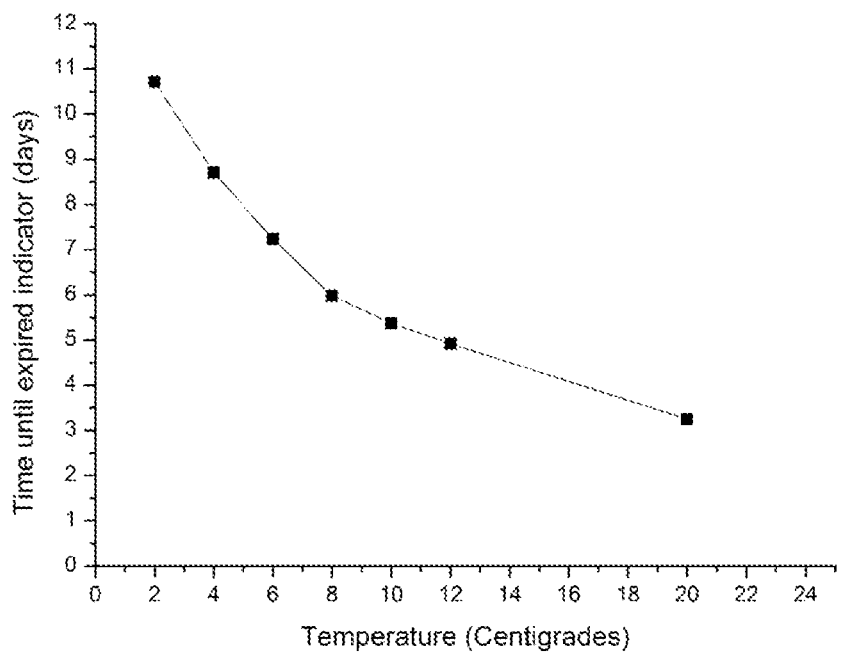
FIG. 3 illustrates the time-temperature sensitivity of the system at specific temperatures and how the time-temperature sensitivity changes with temperature.
Y-axis: Number of days until the indicator reaches a fixed value;
X-axis: Temperature (° C.)
Figure 4:
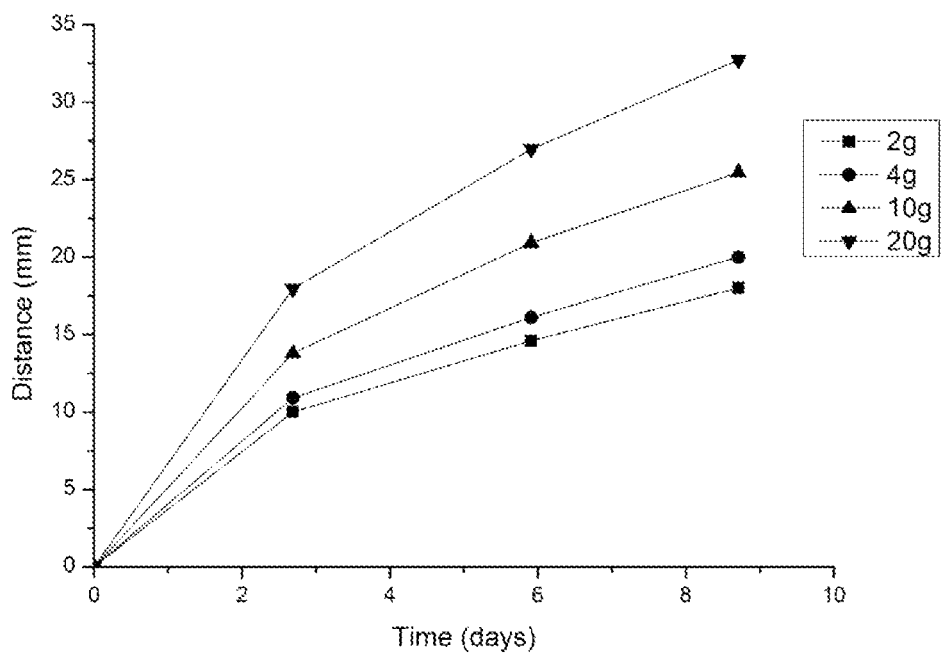
FIG. 4 illustrates the time-temperature sensitivity of the system at specific temperatures and how the time-temperature sensitivity changes with time.
Y-axis: Mobile agent diffusion distance (mm)
X-axis: Number of days

Seven activated time-temperature indicator systems were then kept at a constant temperature of 2° C., 4° C., 6° C., 8° C., 10° C., 12° C. or 20° C. respectively. The time until expiration (pre-set value) was plotted as a function of temperature as shown in FIG. 3 and the distance migrated by the mobile agent was plotted as a function of time as shown in FIG. 4.

Example 2a

Time-temperature Indicator System B

Figure 5:
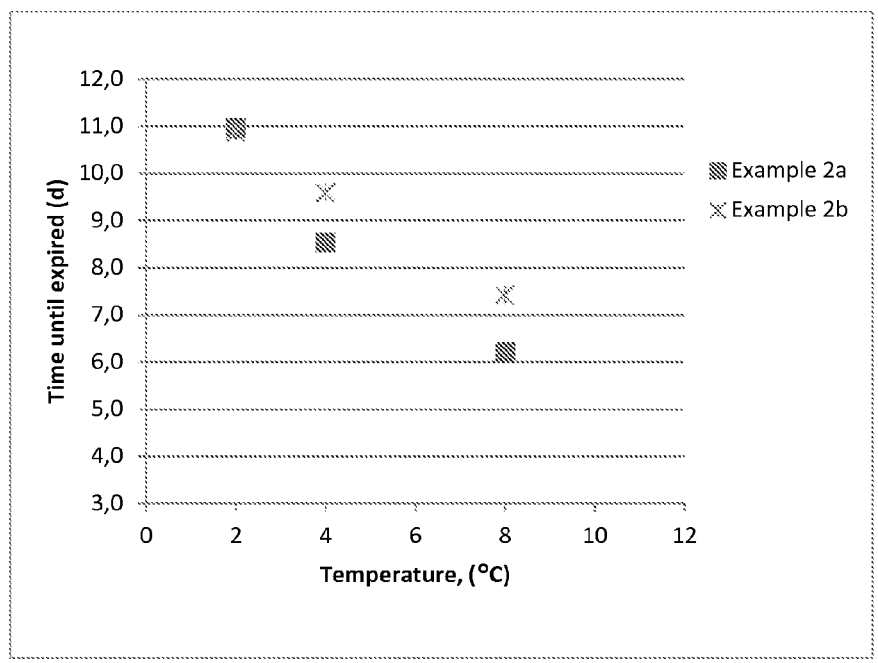
FIG. 5 illustrates the importance of having a temperature sensitive component in the matrix contained in the first compartment.
Y-axis: Number of days until the indicator reaches a fixed value;
X-axis: Temperature (° C.)

"Fish Derived Gelatine"
Preparing the Content which are to be Included in the First Compartment (Gel-strip)
20 ml hot water was added 2,5 g Gelatin, type A (Sigma) and 11,06 g Fish gelatin (Hi Pure fish gelatin, Norland Products) and allowed to dissolve. 5,0 g Trehalose, Sigma and allowed to dissolve. The compound to be immobilized was adding by pipetting 1,75 ml of a 1,0 M CuSO4 solution. Volume was adjusted to 50 ml using hot water.
First matrix component: HiPure fish derived gelatine.
Second matrix component: type A-gelatine.
Immobilized agent=CuSO4.
Preparing the Content which are to be Included in the Second Compartment (Reservoir)
20 ml hot water was added 11,06 g of fish gelatin (HiPure fish gelatin, Norland Products) and 5,0 g Trehalose (Sigma). 8,45 g of K$_4$hexacyanoferrate (Merck) as the mobile compound was added to the solution, followed by diluting with hot water to 50 ml solution.
First matrix component: HiPure fish derived gelatine.
Mobile agent=K$_4$hexacyanoferrate.
Preparing Unactivated Time-temperature Indicator System
The content which are to be included in the first and second compartments was kept at 50° C. allowing the compounds to remain liquid. The matrixes were dispensed using fine nozzles into each of 2 separate plastic polyester cavities prepared by thermoforming a laminate plastic sheet (APET, Wipak) using a blister packaging machine. The matrix filled cavities was sealed using a Polyester top laminate film (OPET, Wipak), resulting in a blister packed liquid material in 2 separate compartments. The unactivated time-temperature indicator systems were then left at room temperature and allowed to cool and gel.
Activating the Above Time-temperature Indicator System
The time-temperature indicator system was activated by breaking the sealing between the two compartments.
Results
Three activated time-temperature indicator systems were then kept at a constant temperature of 2, 4 and 8° C. respectively. The time until expiration (pre-set value) was plotted as a function of temperature as shown in FIG. 5.
The produced time-temperature indicator system yielded a temperature sensitivity (calculated from temperatures 2,4 and 8 C.) calculated to be 14,3 kcal/mole.

Example 2b

Time-temperature Indicator System B

"No Fish Derived Gelatine"
Preparing the Content which are to be Included in the First Compartment (Gel-strip)
20 ml hot water was added 2,5 g Gelatin, type A (Sigma) and 5,0 g Trehalsose, Sigma and allowed to dissolve. The compound to be immobilized was adding by pipetting 1,75 ml of a 1,0 M CuSO4 solution. Volume was adjusted to 50 ml using hot water.
First matrix component: type A-gelatine
Immobilized agent=CuSO4.
Preparing the Content which are to be Included in the Second Compartment (Reservoir)
20 ml hot water was added 11,06 g of fish gelatin (HiPure fish gelatin, Norland Products) and 5,0 g Trehalose (Sigma). 8,45 g of K$_4$hexacyanoferrate (Merck) as the mobile compound was added to the solution, followed by diluting with hot water to 50 ml solution
First matrix component: HiPure fish derived gelatine.
Mobile agent=K$_4$hexacyanoferrate.
Preparing Unactivated Time-temperature Indicator System
The content which are to be included in the first and second compartments was kept at 50° C. allowing the compounds to remain liquid. The matrixes were dispensed using fine nozzles into each of 2 separate plastic polyester cavities prepared by thermoforming a laminate plastic sheet (APET, Wipak) using a blister packaging machine. The matrix filled cavities was sealed using a Polyester top laminate film (OPET, Wipak), resulting in a blister packed liquid material in 2 separate compartments. The unactivated time-temperature indicator systems were then left at room temperature and allowed to cool and gel.
Activating the Above Time-temperature Indicator System
The time-temperature indicator system was activated by breaking the sealing between the two compartments.
Results
Three activated time-temperature indicator systems were then kept at a constant temperature of 2, 4 and 8° C. respectively. The time until expiration (pre-set value) was plotted as a function of temperature as shown in FIG. 5.
The produced time-temperature indicator system yielded a temperature sensitivity (calculated from temperatures 2,4 and 8 C.) calculated to be 9,7 kcal/mole, thus a significant 32% reduction in temperature sensitivity as compared to the time-temperature indicator system presented in example 2a.

We claim:
1. Time-temperature indicator system, comprising at least one reactive agent and at least one mobile agent; said at least one reactive agent being contained in a first compartment adjacent to a separate second compartment containing the at least one mobile agent; said first and second compartments initially being separated by a sealing for preventing contact between the at least one mobile agent and the at least one reactive agent; the system being activated by bringing said two compartments into contact and thereby allowing for the at least one mobile agent to migrate through a matrix contained in the first compartment;
 said matrix contained in the first compartment comprising a mixture of at least a first and a second matrix component;
 said first matrix component being a gel-forming polymer having a melting point below 90° C.; and
 said second matrix component being either i) a reversible gel-forming polymer having a melting point that is at least 5° C. higher than the melting point of said first matrix component or ii) an irreversible gel-forming polymer;
 wherein at least one of said at least one reactive agent is contained within the matrix contained in the first compartment and/or at least one of said matrix components contained in the first compartment is at least one of the at least one reactive agent.

2. Time-temperature indicator system according to claim 1, said at least one reactive agent being contained within the matrix contained in the first compartment.

3. Time-temperature indicator system according to claim 1, wherein at least one of said matrix components contained in the first compartment is at least one of the at least one reactive agent.

4. Time-temperature indicator system according to claim 1, wherein said second matrix component contained in the first compartment is at least one of the at least one reactive agent.

5. Time-temperature indicator system according to claim 1, wherein said first matrix component contained in the first compartment is at least one of the at least one reactive agent.

6. Time-temperature indicator system according to claim 1, wherein said first matrix component has a melting point which is in the range −10 to 50° C.

7. Time-temperature indicator system according to claim 1, wherein the melting point of the second matrix component is at least 10° C. higher than the melting point of said first matrix component.

8. Time-temperature indicator system according to claim 1, wherein at least one of the at least one mobile agent interact or react with at least one of the at least one reactive agent when brought in contact with each other.

9. Time-temperature indicator system according to claim 8, wherein the reaction or interaction between at least one of the at least one mobile agent and at least one of the at least one reactive agent is irreversible or substantially irreversible.

10. Time-temperature indicator system according to claim 8, wherein the reaction or interaction is visually detectable.

11. Time-temperature indicator system according to claim 1, wherein
at least one of said at least one reactive agent is a reducing agent and at least one of said at least one mobile agent is an agent which is reduced by said reducing agent when the two agents are brought in contact with each other;
at least one of said at least one mobile agent is a reducing agent and at least one of said at least one reactive agent is an agent which is reduced by said reducing agent when the two agents are brought in contact with each other;
at least one of said at least one reactive agents agent is an oxidizing agent and at least one of said at least one mobile agent is an agent which is oxidized by said oxidizing agent when the two agents are brought in contact with each other;
at least one of said at least one mobile agent is an oxidizing agent and at least one of said at least one reactive agent is an agent which is oxidized by said oxidizing agent when the two agents are brought in contact with each other;
at least one of said at least one reactive agent is an agent which forms a complex with at least one of said at least one mobile agents agent when the two agents are brought in contact with each other;
at least one of said at least one reactive agent is an agent which forms a precipitate with at least one of said at least one mobile agent when the two agents are brought in contact with each other; or
at least one of said at least one mobile agent is an agent which forms a chelate with at least one of said at least one mobile agent when the two agents are brought in contact with each other.

12. Time-temperature indicator system according to claim 1, wherein the mobile agent-reactive agent pair is selected from the pairs listed in the below table

| Mobile agent - Reactive agent Pair | |
|---|---|
| Mobile agent | Reactive agent |
| Methylene blue | Carrageenan |
| $Fe^{3+}$ or $Cu^{2+}$ salt | $FeCN_6^{4-}$ salt |
| $FeCN_6^{4-}$ salt | $Fe^{3+}$ or $Cu^{2+}$ salt |
| Iodide | $Cu^{2+}$ salt |
| Sulphate, Carbonate or Phosphate | $Ca^{2+}$ salt |
| Glucose, Fructose or Tiosulphate | Starch-iodine complex |
| Glucose, Fructose or Tiosulphate | Iodine |
| $Fe^{2+}$ salt | $FeCN_6^{3-}$ salt |
| $FeCN_6^{3-}$ salt | $Fe^{2+}$ salt. |

13. Time-temperature indicator system according to claim 2, wherein
the mobile agent is selected from the group consisting of glucose, fructose, tiosulphate or any combination thereof;
the reactive agent is iodine; and
said first matrix component or said second matrix component is selected from the group consisting of starch, starch derivative or any combination thereof.

14. Time-temperature indicator system according to claim 3, wherein
the mobile agent is selected from the group consisting of glucose, fructose, tiosulphate or any combination thereof;
the reactive agent is selected from the group consisting of starch-iodine complex, starch derivative-iodine complex or any combination thereof.

15. A combination, comprising the system according to claim 1 and a product storage container or a bag closure device.

16. A combination according to claim 15, wherein said system is associated with, integrated with or incorporated in said bag closure device.

17. A method for producing the time-temperature indicator system according to claim 1, comprising the following steps:
forming at least a first and a second separate compartments in a plastic sheet layer,
filling said first compartment with a composition comprising the matrix$_{(sol\ state)}$ and/or the at least one reactive agent defined in claim 1;
filling said second compartment with a composition comprising the at least one mobile agent defined in claim 1;
sealing said compartments by a second layer;
optionally, allowing at least one of the matrix components defined in claim 1 to undergo a sol-gel transition;
optionally, activating said device by selectively compressing at least one compartment formed by the two layers thus bringing the two compartments into contact.

* * * * *